G. M. HINKLEY.
Saw-Guide.

No. 164,301. Patented June 8, 1875.

WITNESSES:

INVENTOR:
G. M. Hinkley
By his atty.
Dodge &Son

UNITED STATES PATENT OFFICE.

GEORGE M. HINKLEY, OF MILWAUKEE, WISCONSIN.

IMPROVEMENT IN SAW-GUIDES.

Specification forming part of Letters Patent No. 164,301, dated June 8, 1875; application filed May 8, 1874.

*To all whom it may concern:*

Be it known that I, GEORGE M. HINKLEY, of Milwaukee, in the county of Milwaukee and State of Wisconsin, have invented certain Improvements in Saw-Guides, of which the following is a specification:

My invention consists in a novel manner of constructing the guide to permit of its being turned back instantly clear of the saw, and to permit of its arms being adjusted with relation to each other, or adjusted laterally without changing their relative positions, as hereinafter explained.

Figure 1:
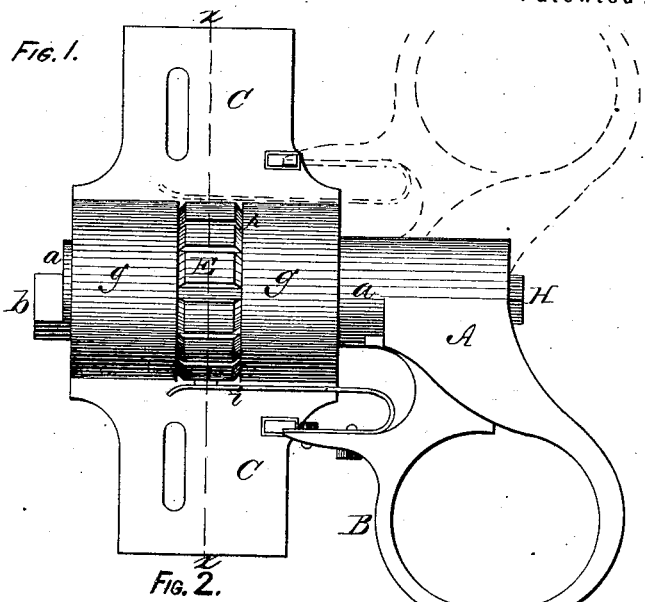
Figure 2:
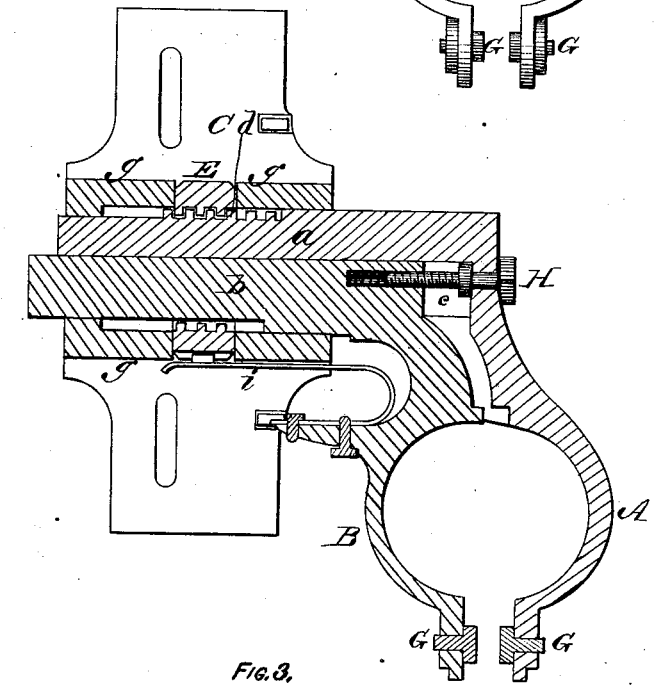

Figure 1 is a top-plan view of my guide; Fig. 2, a horizontal section of the same, and Fig. 3 a vertical section on the line $x \ x$ of Fig. 1.

In constructing my device I first provide one of the guiding arms or bars A, having a round or cylindrical shank, $a$, which stands at right angles to the arm, as shown in Figs. 1 and 2. On the outside of the shank $a$ I cut a screw-thread, $d$, and lengthwise in one side I cut a slot or recess, $c$. I next provide the other and inner guiding-arm B, having a shank, $b$, of the proper form to fit within the groove or recess $c$ in the shank $a$ of arm A, as shown in all three figures.

It will be seen that the shank of arm B, fitting within the shank of arm A, holds the two arms in their proper relative positions opposite or in line with each other, while at the same time the distance between the arms may be varied as required by sliding the one shank in the other. It will also be observed that the two shanks, fitted together in the manner shown, form, as it were, but one round or cylindrical compound shank for both arms.

In order to hold the arms at the proper distance apart, and permit of their being adjusted to and from each other, I insert a screw, H, through the end of the shank of arm A into the shank of arm B, arranging it so that it cannot move endwise in the former, as shown in Fig. 2. By turning this screw the distance between the arms may be varied with the greatest nicety. The ends of the arms are provided with wooden pins or blocks G, extending inward for the saw to run between, as usual.

Having thus provided the guide-arms I next provide a bed-plate, C, having on its upper face two studs or lugs, $g$, through which I make a horizontal hole of the proper size to receive the compound shank $a \ b$. Between the studs $g$ I place a round nut, E, having its outer edge provided with transverse notches or grooves $h$, as shown. I then insert the shank $a \ b$ through the lugs and the nut, as shown in all the figures. The nut, engaging with the thread on shank $a$, holds the same, and thereby the arm A, from moving laterally, while the shank $a$ and screw H, in turn, hold the shank $b$ and its arm B from moving. In this way the nut prevents both arms from being moved laterally, while, at the same time, by moving the nut, both arms may be moved together, and without changing the distance between them. The space between the arms is varied, as before stated, by turning the screw H.

Thus it will be seen the nut serves to move both arms laterally, and the screw to vary the distance between them.

Figure 3:
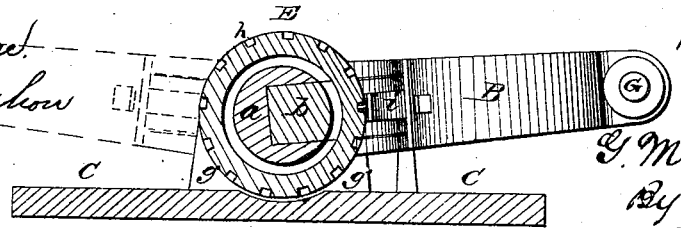

When the guide is in use it stands in the position shown in Fig. 3, so that the edge of the saw will run between the wooden pins in the ends of the arms A B, as usual. When the saw is to be removed from the arbor, or when, for any other reason, it is desired to throw the guide out of operation, the arms are simply turned over back, as shown in dotted lines, the shank being free to turn in the studs or bearings, so that the arms are free to turn over. In order to turn the nut with the shank, so that the distance between the arms will not be changed by throwing them in and out of use, I secure to the arm B a spring, $i$, the end of which engages in the notches in the periphery of the nut E, as shown. This spring causes the nut to turn back and forth with the shank, and prevents it from being turned thereon accidentally, while at the same time, by simply raising the end of the spring, the nut may be released.

It will be observed that by my method of constructing the guide I permit it to be thrown in and out of use instantly, and without the use of any tool or instrument whatever; that the distance between the arms may be varied readily and accurately, and that the arms may be moved laterally without the use of any tool, and without changing the space between them.

Having thus described my invention, what I claim is—

1. A saw-guide constructed substantially as shown and described, and operated in the manner set forth.

2. The saw-guide consisting of the arm A, having the grooved and threaded shank $a$, the arm B, having the shank $b$ fitted into the shank $a$, the screw H, and the bed-plate C, having the nut E mounted therein.

3. In combination with the arms A B, having the shanks $a\ b$, constructed and arranged as shown, the support C, nut E, and spring $i$, arranged as shown.

GEORGE M. HINKLEY.

Witnesses:
   WM. W. ALLIS,
   WILLIAM H. WATSON.